United States Patent [19]
Gonze et al.

[11] Patent Number: 5,277,025
[45] Date of Patent: Jan. 11, 1994

[54] EXHAUST BURNER CONTROL

[75] Inventors: Eugene V. Gonze, Sterling Heights; Terrance L. Stark, Washington, both of Mich.

[73] Assignee: General Motors Corporation, Detroit, Mich.

[21] Appl. No.: 937,026

[22] Filed: Aug. 31, 1992

[51] Int. Cl.⁵ .................................................. F01N 3/10
[52] U.S. Cl. .......................................... 60/274; 60/284
[58] Field of Search ................ 60/274, 284, 286, 289, 60/290

[56] References Cited

U.S. PATENT DOCUMENTS

| | | | |
|---|---|---|---|
| 3,392,522 | 7/1968 | Haas | 60/284 |
| 3,650,111 | 3/1972 | Reichhelm | 60/284 |
| 3,751,914 | 8/1973 | Pollock | 60/284 |
| 4,581,891 | 4/1986 | Usui et al. | 60/284 |
| 5,193,340 | 3/1993 | Kamihara | 60/286 |
| 5,211,011 | 5/1993 | Nishikawa et al. | 60/284 |

Primary Examiner—Tony M. Argenbright
Assistant Examiner—M. Macy
Attorney, Agent, or Firm—Howard N. Conkey

[57] ABSTRACT

A control system for an internal combustion exhaust gas heater provides air and fuel to the heater in appropriate proportion to be rapidly ignited therein upon activation of the control system. When flame is present in the heater, the proportion of air and fuel is adjusted to provide maximum heat energy from the heater to the exhaust gas for a predetermined period of time.

8 Claims, 6 Drawing Sheets

EXHAUST BURNER CONTROL

FIELD OF THE INVENTION

This invention relates to exhaust gas treatment in internal combustion engines and, more specifically, to a method and apparatus for controlling a heater for internal combustion engine exhaust gas.

BACKGROUND OF THE INVENTION

It is generally known that undesirable emissions of internal combustion engines may be significantly reduced by passing the engine exhaust gas through catalytic converters. When conventional converters are at light-off temperatures, such as temperatures above 350 degrees Celsius, exothermic reactions occur therein, resulting in efficient reduction of engine emissions. Converter temperature may be elevated to light-off temperature from latent exhaust gas heat. On cold start, a converter heated with latent exhaust gas heat may, under normal engine warm-up conditions, require 75 seconds or more to reach its light-off temperature.

Additional heat sources have been proposed for more rapid heating of the converter, so that efficient conversion of undesirable exhaust gas constituents may begin earlier after engine cold start. For instance, electrically heated converters have been proposed, in which electrical energy is selectively applied to a device that converts the electrical energy to thermal energy, which is made available to the converter. The efficiency of such heating systems requires that substantial electrical energy be expended before any significant emission reductions may be provided.

Alternatively, burner systems have been proposed for rapid heating of the converter. An example of such systems is provided in copending application U.S. Ser. No. 07/936467, filed Aug. 28, 1992, entitled "Exhaust Burner Catalyst Preheater," assigned to the assignee of this application. Such systems attempt to ignite an air/fuel mixture at a point upstream of the converter, whereby the released combustion energy operates to rapidly increase converter temperature. Although not suffering from the drawbacks of electrically heated units, such systems require coordinated control of a fuel input, an air input, and ignition, to ensure that the air/fuel mixture ignites as soon as possible at engine start-up, and that once lit, the burner expediently heats the catalytic converter to its light-off temperature.

SUMMARY OF THE INVENTION

Accordingly, it is an object of the present invention to provide a method and apparatus for control of air, fuel and ignition in an exhaust gas burner.

Another object of this invention is to provide burner control that minimizes the time to combustion in a burner system, and that, once combustion is present in the burner, maximizes the heat energy delivered by the burner system to the exhaust gas stream and to the catalytic converter.

These and other aspects of this invention are provided by a method and apparatus wherein air and fuel quantities are issued to a burner in appropriate proportions to be quickly ignited by a periodic ignition source, such as a spark plug. Once combustion is assumed to be present in the burner, such as from information provided by a combustion sensing routine or after fuel and spark have been appropriately provided to the burner for a predetermined period of time, air and fuel are admitted to the burner in a predetermined proportion with consideration to the physical constraints of the system to provide a maximum heat energy to the catalytic converter until it may be assumed that the converter is substantially at its light-off temperature. The burner may then operate for a predetermined period of time to maintain the converter at a suitable temperature, or may be disabled.

BRIEF DESCRIPTION OF THE DRAWINGS

The invention may be best understood by reference to the following description of a preferred embodiment and to the drawings in which.

DESCRIPTION OF THE PREFERRED EMBODIMENT

Figure 1:
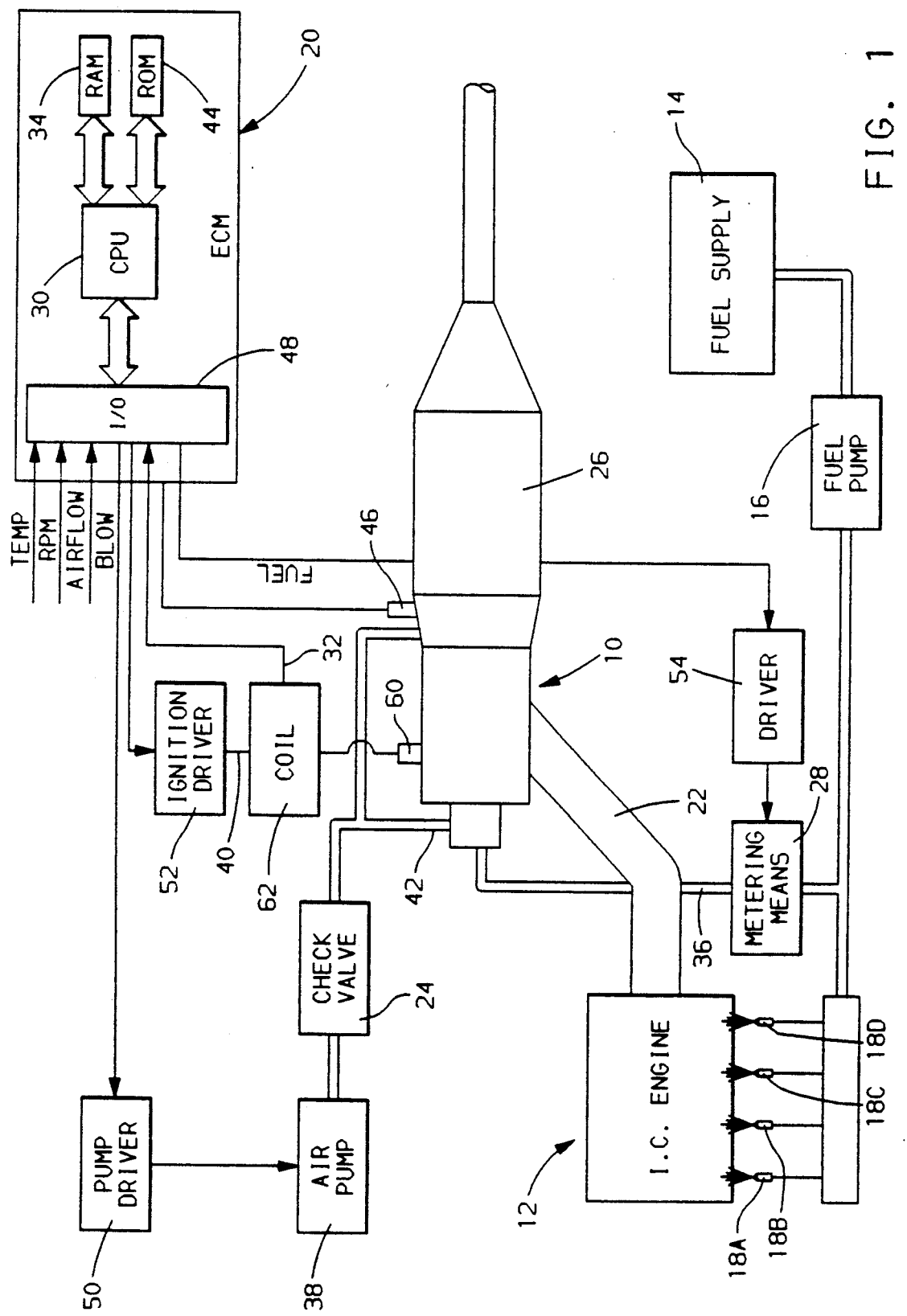
FIG. 1 is a general schematic diagram of a typical application of an exhaust burner assembly to a catalytic converter controlled according to a preferred embodiment of this invention.

FIG. 1 schematically illustrates a typical application of the exhaust burner assembly (10) controlled in accord with the present invention to the exhaust system of an internal combustion engine (12). The burner assembly (10) is disposed in the exhaust system in such a manner that exhaust gas passes from the engine (12) to the burner assembly (10) via an exhaust conduit (22). The burner assembly (10) is operably connected with a catalytic converter (26) through which the exhaust gas passes after exiting the burner assembly.

A conventional engine controller (20), such as an engine control module ECM monitors engine parameters through sensors (not shown) and varies fuel, air, and spark to the engine accordingly. The ECM (20) may be an eight-bit, single chip microcomputer, such as a Motorola MC68HC11, with a central processing unit CPU (30) which executes a series of routines for general engine control and for burner control in accord with this invention, such as the routines illustrated in FIGS. 2 and 3 herein. The CPU (30) reads the routines and various predetermined data constants from read only memory ROM (44) and stores and accesses data in a well-known manner from random access memory RAM (34). The ECM (20) communicates input and output information via input/output unit I/O (48).

Combustion air is supplied to the burner assembly (10) from an engine driven or electrical air pump (38) via conduit (42). The pump (38) receives its air from an air cleaner (not shown). The pump (38) is controlled by the ECM (20) via a pump driver circuit (50), so that a proper quantity of air is administered to the burner assembly (10) at appropriate times. The ECM (20), in accord with this invention, determines the air quantity required to produce a desired air/fuel ratio in the burner (10), and then determines the pump drive current needed to deliver that amount of air. A scaled current command BLOW, representing that amount of current, is issued to pump driver circuit (50) via I/O (48) at appropriate times. The driver circuit (50) may be any conventional current control circuit capable of taking the scaled current command BLOW and driving the pump (38) at a level of current substantially proportional to BLOW. For example, in the case that the pump actuator is a direct current device, BLOW represents a level of direct current to be applied to the pump (38), such as by operating a gate driver that gates a substantially fixed level of voltage on and off to the pump at a duty cycle proportional to the desired current level.

The air from the pump (38) passes through a check valve (24) before reaching the burner assembly (10). The check valve (24) may be a conventional one-way valve that prevents exhaust gas backflow into the pump (38). The valve should pass virtually no air when closed, and should have minimum airflow restriction when open. The valve (24) may be opened when upstream air pressure significantly exceeds downstream air pressure, such as from operation of the air pump (38).

The engine (12) is supplied with fuel from a fuel system comprising fuel supply (14), such as a fuel tank, and fuel pump (16) which delivers pressurized fuel-to-fuel metering means (28) and to fuel injectors (18a-18d), which meter the fuel to the engine (12). The metering means (28) may be a conventional fuel injector or fluid pressure regulator, or a fuel pump. Metering means (28) is controlled by ECM (20) to meter appropriate amounts of fuel to burner assembly (10), via conduit (36), at appropriate times.

The ECM (20) determines the fuel quantity required to produce a desired air/fuel ratio in the burner assembly (10) and, in the preferred embodiment of this invention using a conventional fuel injector with a 1 gram per second gasoline metering capacity as the fuel metering means (28), determines FUEL, a fuel injection duration command to allow the injection pulse required to inject that fuel quantity to the fuel conduit (36). FUEL is loaded into an output register in ECM I/O (48), and is issued to metering means driver (54). The metering means driver (54) converts the command FUEL to a pulse duration for an injector drive pulse. The pulse duration is the amount of time the injector will be held open for each of its periodic injections. In this embodiment, for stable combustion, the commanded pulse width is provided to the injector approximately every 5 milliseconds. Conventional fuel delivery means is used to administer the metered fuel to the burner assembly (10) from conduit (36), such as a nozzle (not shown).

In the preferred embodiment of this invention, a conventional spark plug (60) is used to ignite an air/fuel mixture in the burner assembly (10), and is excited in a well-known manner. A periodic control pulse is issued from the ECM (20) to ignition driver circuit (52), which may include a conventional step-up transformer (not shown) gated on and off via the control pulse. While on, the transformer charges up. When switched off, the transformer discharges through drive line (40) and across the air gap in the spark plug (60) from cathode to anode, providing spark. The inventors do not intend that the air/fuel mixture igniting means be limited to a conventional spark plug. Rather, any means of providing ignition to an air/fuel mixture may be used, such as a conventional glow plug or an electrically conductive heating coil.

However, in the preferred embodiment using a conventional spark plug for ignition, burner combustion detection may be provided using the combustion detection method and apparatus described in copending application U.S. Ser. No. 07/902249, filed Jun. 22, 1992, entitled "Combustion Detection," assigned to the assignee of this application. In general, a sense coil (62), of approximately 200 turns, such as a Wabash Magnetics solenoid, part no. 5234214, surrounds the spark plug drive line (40) in such a manner that changes in current through the excitation line (40) will, according to well-established principles of electromagnetic field theory, induce current through coil (62), and thus will induce potential across the coil, which may be monitored by the ECM (20) by sensing that potential, for instance the potential between coil tap (32) and electrical ground.

In the absence of flame in burner assembly (10), a comparatively large voltage spike will appear across coil (62) shortly after the surge of spark inducing current passes through drive line (40). However, a comparatively small spike will appear across coil (62) when flame is present, due to an ionization effect, wherein current carrying ions are provided across the spark plug gap by flame in proximity to the gap, reducing the resistance across the gap. By distinguishing between the two spikes, as described in the above-referenced copending application, the ECM (20) may rapidly and reliably determine whether flame is present in burner assembly (10).

The temperature of catalytic converter (26) is monitored using temperature sensor (46), such as a conventional thermocouple or thermistor. The temperature is communicated to ECM (20).

Figure 2:
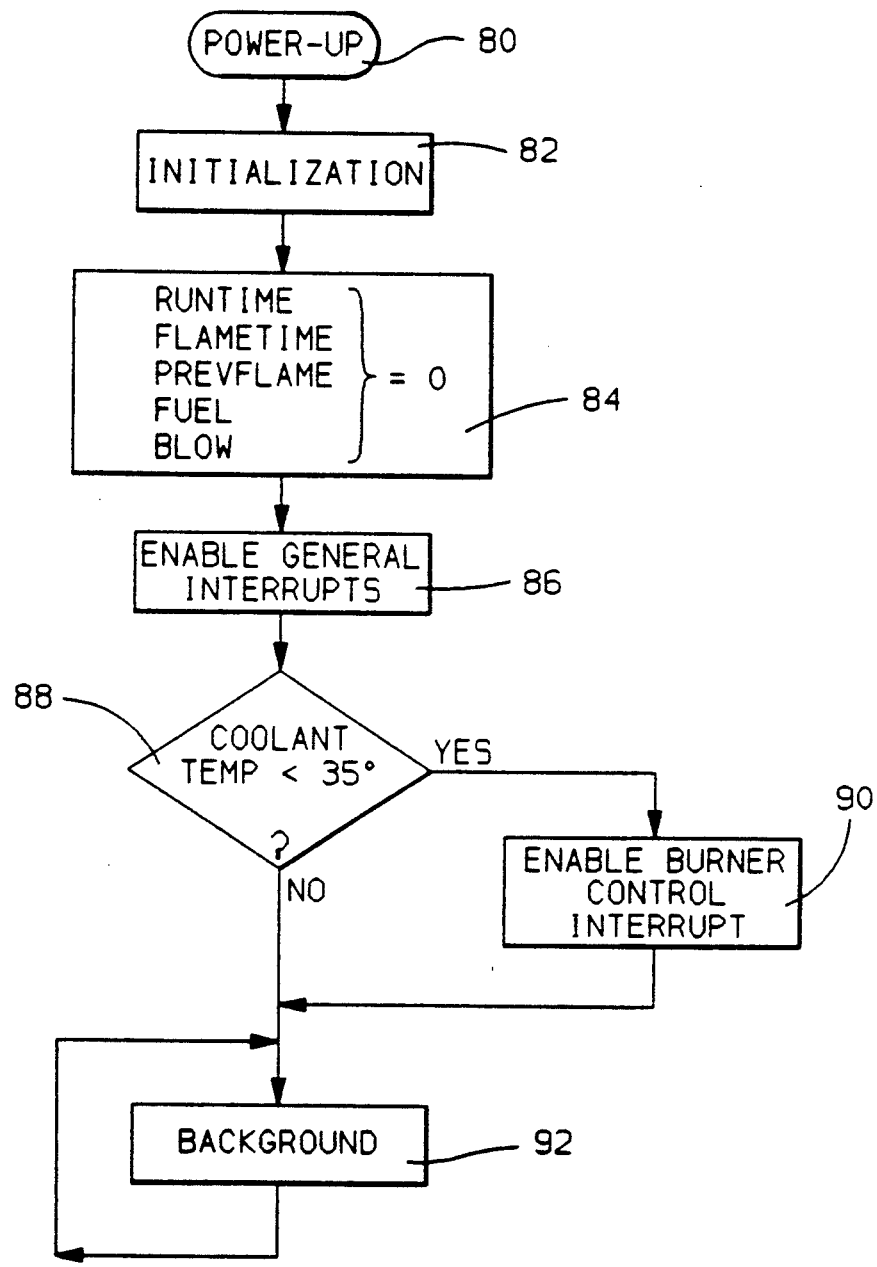
FIGS. 2 and 3a-3c are computer flow diagrams illustrating the steps used to control the burner of FIG. 1 in accord with a preferred embodiment.

The routines used to carry out the principles of this invention of burner control in accord with a preferred embodiment are illustrated in FIGS. 2 and 3. These routines may be stored in non-volatile memory in ECM (20), such as in ROM (44), and are accessed on an instruction-by-instruction basis by CPU (30). The first of such routines is accessed when power is applied to the ECM (20), such as when the vehicle operator rotates the vehicle power switch to its "ON" position. This routine is illustrated in FIG. 2, and is entered at step (80). The routine proceeds to step (82), to carry out general software initialization, such as assigning initial values to counters, flags, and pointers, and reading analog inputs from various sensors, such as an engine coolant temperature sensor (not shown). Analog inputs are converted to digital approximations via conventional analog to digital converters and are stored in ROM designated areas of RAM (34).

Next, the routine proceeds to step (84), to carry out initialization directed specifically to burner control in accord with this embodiment. At this point, RAM variables RUNTIME, FLAMTIME, PREVFLAM, FUEL, and BLOW, to be described, are set to zero. The routine then advances to step (86) to enable interrupts used in general engine control. Such interrupts are initialized to occur periodically, either after some predetermined time has elapsed, or upon the occurrence of some event. Routines used to service these interrupts are provided in a well-known manner.

Next, at step (88), engine coolant temperature, as read from the engine coolant temperature sensor at step (82), is compared to a predetermined threshold temperature. Coolant temperature provides information on both engine temperature and exhaust system temperature, and thus may be used to estimate when the engine and exhaust system is of sufficient temperature that any supplemental heating that may be provided by the burner (10) in accord with this invention is not necessary. Such would be the case when it is estimated that, at step (88), the converter is at or substantially close to its light-off temperature. An appropriate coolant threshold temperature may be determined in a calibration step, by selecting an engine start-up coolant temperature which indicates a system, including the engine and exhaust system, that will quickly heat the converter (26) to its light-off temperature. In this embodiment, the threshold temperature is calibrated as 35 degrees Celsius.

Accordingly, at step (88), if coolant temperature exceeds or is equal to 35 degrees Celsius, the routine does not enable the burner control interrupt, by bypassing step (90). However, if coolant temperature is below 35 degrees Celsius at step (88), the routine moves to step (90) to enable the burner control interrupt. In this embodiment, the interrupt is enabled to occur after a preset period of time has elapsed, such as 100 milliseconds. The interrupt is set up to vector processor control to the routine illustrated herein as FIGS. 3a–3c, which will instruct the CPU (30) to re-enable the interrupt to occur approximately 100 milliseconds after its last occurrence. This process of repeating the interrupt invoking the routine of FIGS. 3a–3c will continue until a fault is detected in the burner system or until the burner system has completed its heating task in accord with this invention, such as after a predetermined period of time has elapsed.

Returning to FIG. 2, after enabling the burner control interrupt at step (90), or if step (90) was bypassed by step (88), the routine advances to step (92), to continuously carry out background functions while the ECM (20) is operating. The background functions may include conventional diagnostic or maintenance routines, and are interrupted upon the occurrence of one of the enabled interrupts.

Figure 3A:
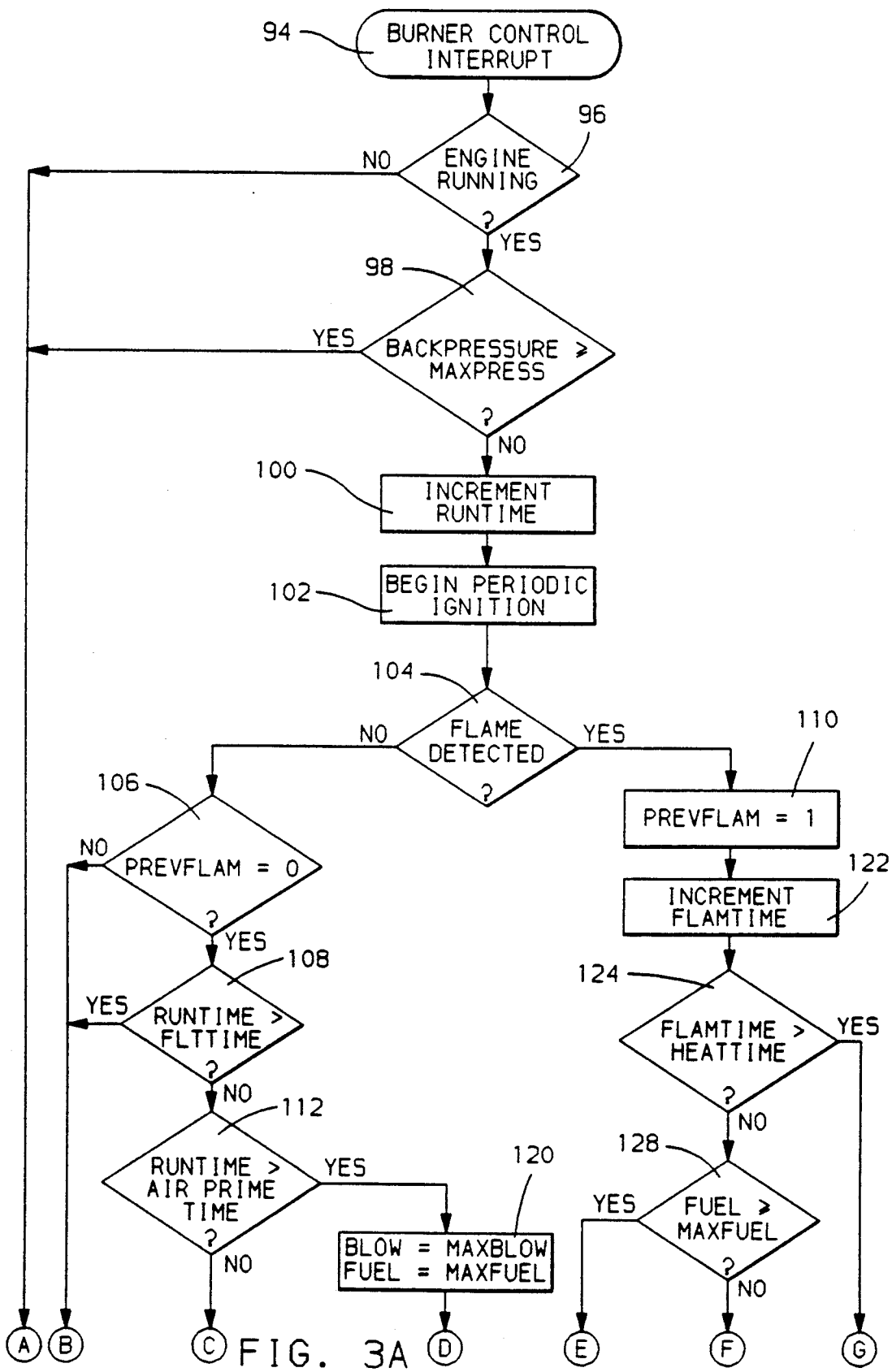
Figure 3B:
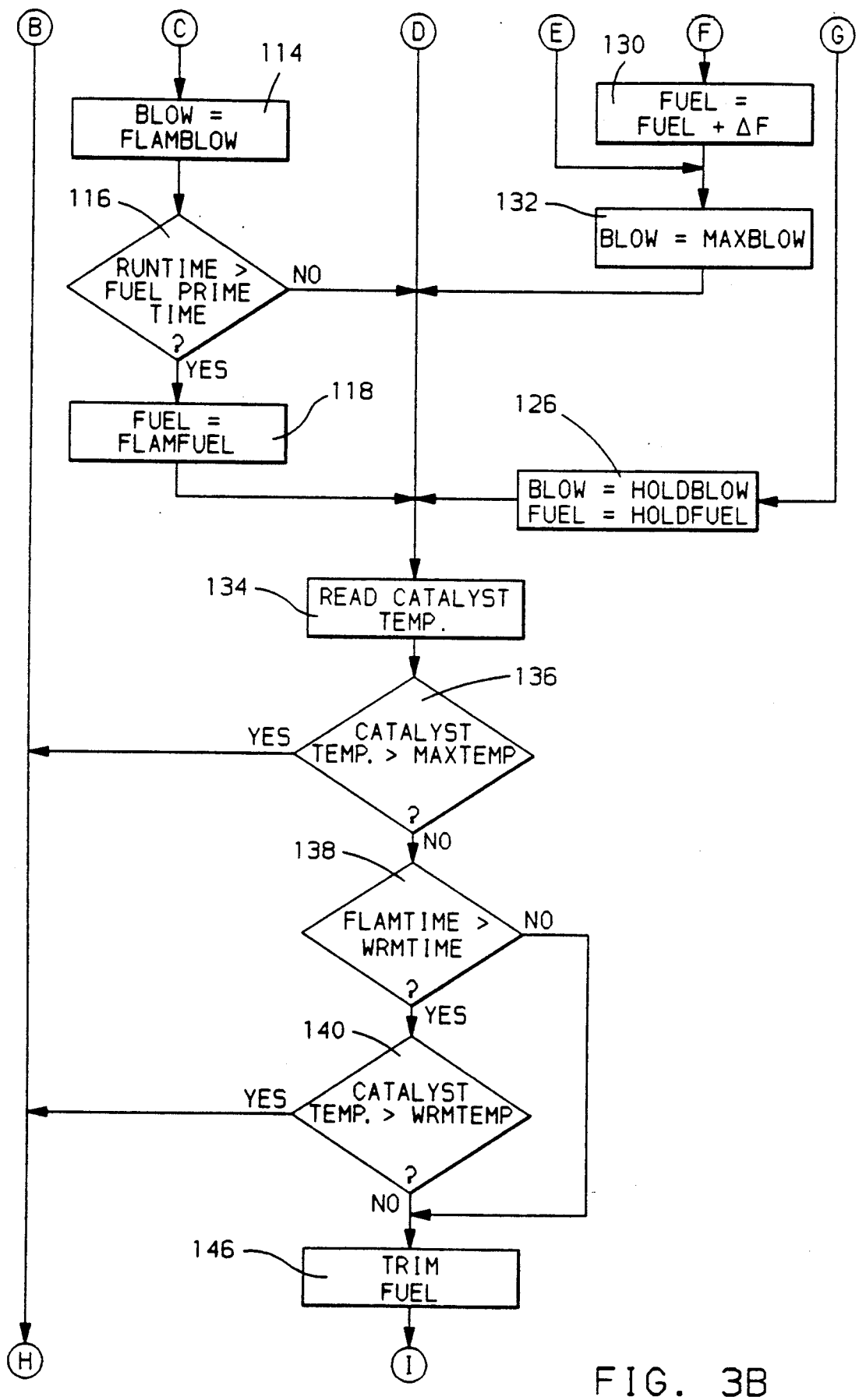
Figure 3C:
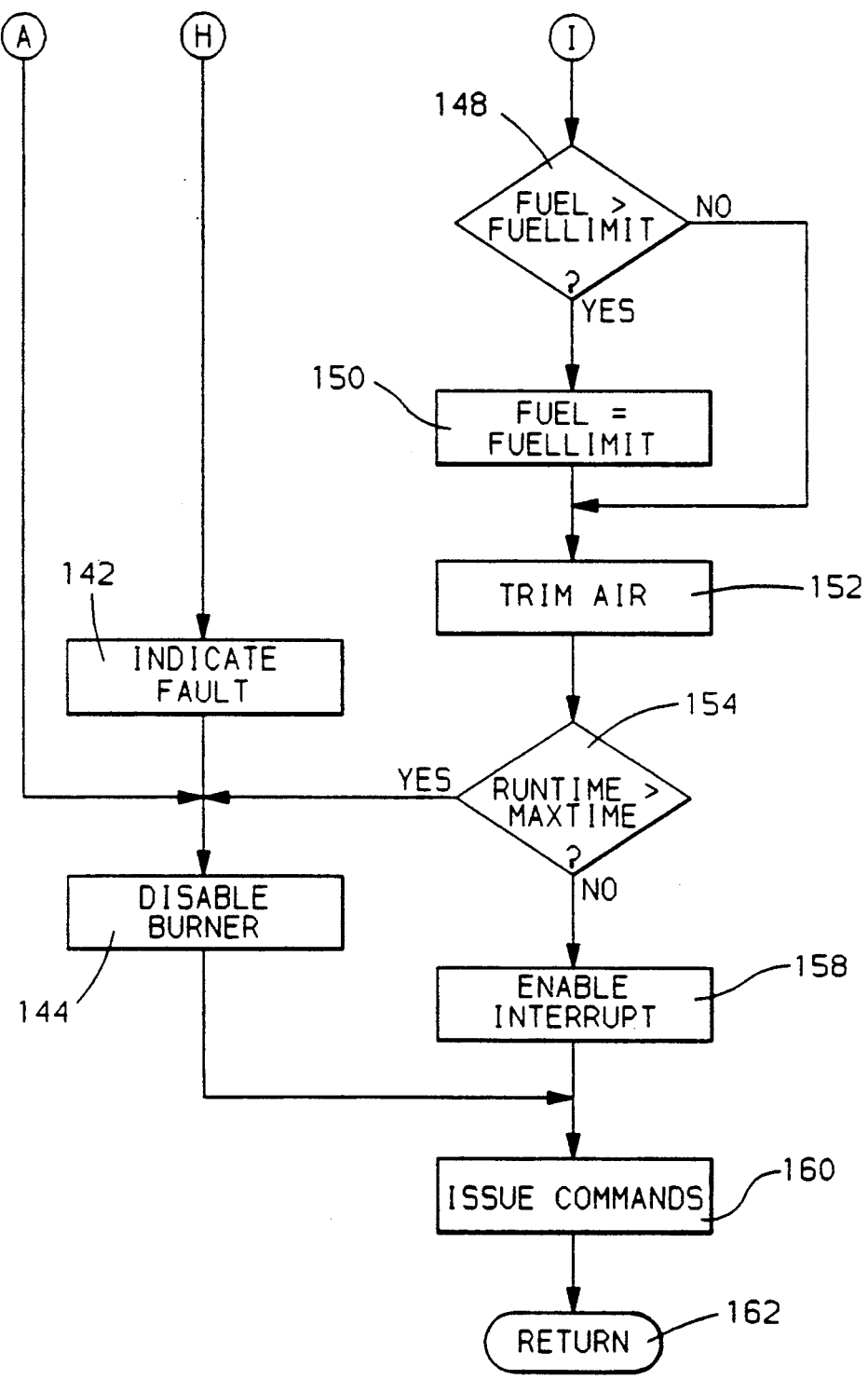

As described, the specific routine used to detail the principles of this invention in accord with a preferred embodiment is illustrated in FIGS. 3a–3c. This routine provides for control and general diagnostics of the burner system illustrated in FIG. 1, including control of air, fuel, and spark, consistent with two main control goals. The first goal is to ignite an air/fuel mixture in the burner (10) as soon as possible on cold start. In the preferred embodiment, combustion is attempted after the engine (12) is determined to be running. However, for even earlier combustion, the air/fuel mixture may be admitted to and ignited in the burner (10) as soon as power is applied to the ECM (20), such as when the vehicle operator rotates the vehicle power switch to its "ON" position.

Such combustion requires an appropriate and precise blending of air and fuel, together with a periodic spark in the burner. First, the air and fuel conduits are primed, then an easily ignitable combination of air and fuel is provided to the burner assembly (10) together with a periodic spark signal. Once the first goal of initial combustion is met, which may be indicated by a flame detector in the burner, the second goal must be provided for. This second goal is controlled heating of the catalytic converter, including a maximum heating mode and a hold temperature mode.

Figure 4A:
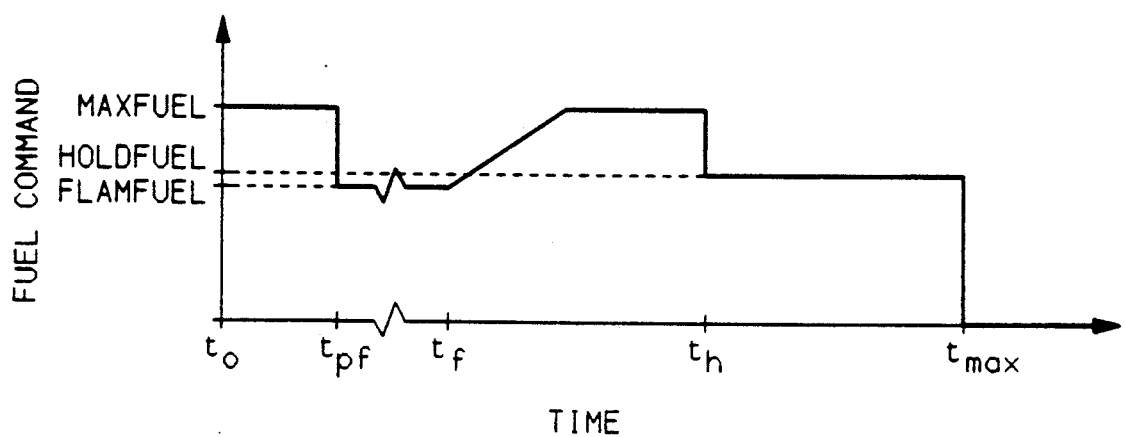
FIGS. 4a and 4b are diagrams of the fuel and air commands generated in the control steps of FIGS. 2 and 3.
Figure 4B:
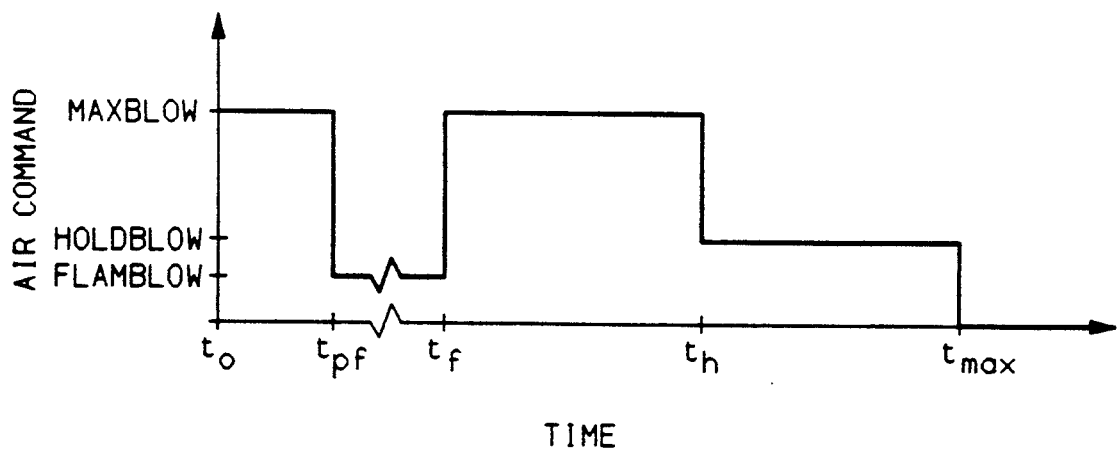

FIGS. 4a and 4b are general diagrams of the fuel and air commands over the time the burner (10) is operating. In accord with a preferred embodiment of this invention, fuel and air commands may be issued to the respective actuators as generally illustrated in FIGS. 4a and 4b to provide for the above-described first and second goals. Specifically, the fuel system is primed at MAXFUEL from time $t_o$ until $t_{pf}$, and the air system is primed at a command MAXBLOW from time to until $t_{pa}$. After priming is complete, the fuel and air commands are reduced to FLAMFUEL and FLAMBLOW, respectively, to provide appropriate conditions for combustion in the burner (10).

When combustion is detected, such as at time $t_f$ in FIGS. 4a and 4b, the fuel and air commands are increased rapidly to provide for maximum exhaust gas heating. The commands are limited to predetermined maximum values and, when a predetermined amount of heat energy has been transferred to the exhaust gas, such as at time $t_h$ in FIGS. 4a and 4b, the fuel and air commands may be reduced to zero, or to levels sufficient to hold the converter (26) at a desirable temperature, such as its light-off temperature. Finally, when latent engine exhaust gas heat alone may be sufficient to maintain the converter (26) at light-off, the burner's job in any case is complete, and the fuel and air commands are reduced to zero, disabling the burner (10).

Returning to FIG. 3a, the specific steps for burner control are illustrated, and are entered at step (94) upon the occurrence of the described 100 millisecond burner control interrupt. The routine moves then to step (96), to determine if the engine is running, for example by reading engine speed RPM from an conventional engine speed sensor. If the engine is not running, which may be evidenced by a near zero sensed engine speed, the routine moves to step (144), to disable the burner (10). The burner is disabled by commanding zero air and fuel to the burner, such as by setting the air and fuel commands, BLOW and FUEL, to zero, and by stopping any spark plug ignition. The burner (10) is disabled to avoid unnecessary exhaust gas heating, which may overheat the converter (26), and which inefficiently expends fuel.

Alternatively at step (96), if the engine is determined to be running, the routine proceeds to step (98), to compare engine backpressure to a predetermined backpressure MAXPRESS. Backpressure, the air pressure in the engine exhaust path, is related to the amount of air being pumped through the engine to the exhaust system, and to the restrictiveness of the exhaust system. The restrictiveness is substantially constant, and may be measured in a calibration step. By then measuring instantaneous airflow into the engine, for example using a conventional airmeter (not shown), backpressure may be determined such as by looking up a backpressure value stored in read only memory ROM (44), corresponding to the instantaneous airflow. The stored backpressure values may be determined for several airflow lookup values, according to the following expression $$backpressure = airflow * 4.571$$

where backpressure is expressed in units of kiloPascals, and airflow is expressed in grams per second.

For high engine backpressure, such as backpressure above MAXPRESS, which is set to eight kiloPascals in this embodiment, the amount of air delivered by the pump (38) will be substantially reduced, to the extent that so little fresh air will be provided to the burner assembly that any combustion therein is not likely to be sustainable. This is due to the necessity of a significant pressure drop along the fresh air path before air will flow from the high to low pressure points in the path. Such a pressure drop will be reduced with high backpressure, which will be present in the burner (10), so that the pressure drop from the pump (38) to the burner (10) will not support adequate airflow.

In this embodiment, rather than attempt to drive air and fuel into the burner when backpressure exceeds MAXPRESS and sustained combustion is unlikely, the routine moves to step (144) to disable the burner in the manner described. However, if the backpressure is below MAXPRESS, such that combustion may be sustained in the burner (10), the routine proceeds to step (100), to increment RUNTIME, a RAM variable used to maintain a count of the number of iterations of the routine of FIGS. 3a-3c since it was last enabled at step 90 of FIG. 2, as a time reference for use later in the routine.

After incrementing RUNTIME at step (100), the routine advances to step (102), to enable a periodic spark control pulse of predetermined duration to be issued from ECM I/O (48) to the ignition driver circuit (52). In one embodiment, the pulse should be enabled to automatically be issued at a predetermined frequency that is high enough to rapidly ignite the burner, such as 110 Hertz, and be of sufficient duration, such as 6 milliseconds, to adequately charge up the transformer (not shown) in the driver circuit (52). The periodic pulse, once enabled at step (102), will continue to be issued to the driver circuit (52) while the burner (10) is operating.

Next, the routine advances to step (104) to check for the presence of flame in the burner assembly (10). As described in the above-referenced copending application Ser. No. 07/902249, filed Jun. 22, 1992, combustion in the burner assembly (10) may be detected by monitoring the voltage across coil (32) (FIG. 1) while the ignition driver circuit (52) is issuing spark enable pulses. According to that copending application, if the voltage across coil (30) exceeds a predetermined voltage for a predetermined number of iterations of the combustion detection routine of that application, combustion is assumed to not be present in the burner (10).

In such a case where flame is assumed to not be present, the routine of FIG. 3a proceeds to step (106) to determine if flame had existed previously in the burner (10), as evidenced by RAM variable PREVFLAM being set to one. If PREVFLAM is set to one, a fault is assumed to exist in the burner, as the flame that was once present is now extinguished. In such a case, the routine proceeds to indicate the fault at step (142), for example by storing a fault code in ECM non-volatile memory, such as in a portion of random access memory (34) that is not cleared when the ECM (20) is not operating. The fault may also be indicated by illuminating a light in position to be viewed by the vehicle operator. The routine then disables the burner at step (144), rather than continue to operate when the system is assumed to be incapable of sustaining combustion.

Alternatively at step (106), if no previous flame was detected, the routine moves to step (108), to compare RUNTIME to a predetermined time limit FLTTIME. FLTTIME represents the maximum amount of time allowed to ignite the air/fuel mixture in the burner (10). If combustion is not sensed by the time RUNTIME is incremented to FLTTIME, the opportunity to substantially reduce engine cold start emissions is assumed to be lost. Furthermore, if FLTTIME is properly calibrated, a flame should, under normal operating conditions, be present in the burner before FLTTIME is reached.

Accordingly, if RUNTIME exceeds FLTTIME at step (108), the routine moves to step (142) to indicate a fault in the system, in the manner previously discussed. After indicating the fault, the routine proceeds to disable the burner at step (144), as discussed.

Returning to step (108), if RUNTIME does not exceed FLTTIME, the routine proceeds to steps (112-120), to provide air and fuel to the burner in accord with the pre-combustion phase the burner control is in. Prior to combustion in the burner (10), a first phase of burner control provides a priming of the air and fuel lines. A second phase provides appropriate conditions for combustion in the burner (10). In detail, if, at step (112), RUNTIME is less than AIR PRIME TIME, shown as time $t_{pa}$ in FIG. 4b, the first pre-combustion phase is active in which the air conduit (42) and the fuel conduit (36) must be primed.

Priming of these conduits involves pumping air or fuel through them so as to ensure a fluid pressure level in the conduits that will support precise delivery of desirable quantities of air and fuel to the burner (10). The amount of time needed to prime the air and fuel conduits may be pre-calibrated for the system, and may be minimized, consistent with the goal of rapid exhaust gas heating, by pumping air and fuel through the respective conduits at as high a pumping rate as reasonable. In this embodiment, at the maximum air pumping rate, the air prime time is calibrated to be approximately 400 milliseconds or, for the 100 millisecond iteration rate of the routine of FIG. 3a, AIR PRIME TIME is set to 4.

If at step (112), RUNTIME does not exceed AIR PRIME TIME, the routine moves to step (120), to assign the value MAXBLOW to variable BLOW. MAXBLOW represents a selected maximum operating rate for the air pump (38), and is constrained by the pump's rated maximum operating level, and the power available from the vehicle power system. In this embodiment, MAXBLOW is assigned the value (255), representing that the pump will be driven at 100 percent of its capacity. BLOW is directly proportional to the commanded current at which the pump (38) is driven, and is issued to pump driver circuit (50) later, in the routine of FIG. 3c.

Additionally at step (120), the variable FUEL is assigned the value MAXFUEL, a predetermined value representing a maximum commanded flow rate for fuel into the burner assembly (10). This may be provided in a conventional manner in the case that metering means (28) (FIG. 1) is a conventional fuel injector, by commanding a maximum injector pulse width or duty cycle. In this embodiment MAXFUEL corresponds to a 74 percent injection duty cycle for the injector (28).

Due to the physical differences between the fluids of fuel and air, the fuel and air conduits, and the fuel and air pumps or metering means, different prime times are required for air and fuel. In this embodiment, fuel priming takes more time than air priming, such that at step (120), FUEL will be assigned the value MAXFUEL as long as air is being primed, and maybe longer, as will be discussed.

Returning to step (112), if RUNTIME exceeds a properly calibrated AIR PRIME TIME, shown in FIG. 4b as $t_{pa}$, the air conduit (42) may be assumed to be sufficiently primed for burner control purposes. Such a time is illustrated in FIG. 4b as time $t_{pa}$. Accordingly, the routine moves to step (114), to reduce the commanded air flow into the burner, consistent with pre-combustion phase two, to a setting calibrated for the specific hardware of FIG. 1 to be most conducive to rapid start of combustion in burner assembly (10). This value is labeled FLAMBLOW, and in this embodiment is set at twenty percent of blower capacity.

The routine then proceeds to step (116), to compare RUNTIME to FUEL PRIME TIME, which is a calibrated number of iterations of the routine of FIGS. 3a-3c needed for a priming of the fuel conduit (36). If RUNTIME exceeds FUEL PRIME TIME, which is set to 7 in this embodiment, meaning that the fuel conduit (36) will be primed for approximately 700 milliseconds, pressure is assumed to have built up in the fuel conduit (36) so that sufficiently precise metering of fuel into the burner itself may now occur for rapid start of combustion therein. This time is shown in FIG. 4a as $t_{pf}$. At this time, the routine advances to step (118), to reduce commanded fuel to an amount most conducive to a start of combustion in the burner of FIG. 1, consistent with pre-combustion phase two. In this embodiment, FUEL is set to FLAMFUEL, for example corresponding to 45 percent injector duty cycle. After setting appropriate values for fuel and air at step (114), (118), or (120), the routine of FIG. 3b moves to step (134), to be discussed.

Returning to step (104), if flame is detected in burner assembly (10), such as illustrated at time $t_f$ of FIGS. 4a and 4b, the routine proceeds to step (110) to set PREV-FLAM to one, to indicate that flame has been detected in the burner (10). Next, the routine moves to step (122) to increment a RAM variable FLAMTIME, used to keep a running count of the number of iterations of the routine of FIG. 3a in which flame has been detected in burner assembly. The routine then advances to steps (124-132), to tailor the air and fuel commands according to which post-combustion phase of operation the burner control is in. A first post-combustion phase attempts to provide maximum heat energy to the exhaust gas. A second phase, which is optional, then attempts to hold that converter (26) at a temperature of sufficient magnitude to support exothermic activity therein, such as the light-off temperature of the converter (26), for a predetermined period of time.

Specifically, the routine executes step (124) where FLAMTIME is compared to HEATTIME, which is a predetermined number corresponding to the number of iterations of the routine of FIGS. 3a-3c needed, when flame is present in burner assembly (10), to provide sufficient heat energy to the exhaust gas whereby the catalytic converter (26) may be heated substantially to its light-off temperature. HEATTIME may be determined based on the amount of energy generated in the burner (10) and passed to the converter (26), for instance by monitoring converter temperature change over time in a calibration step. In this embodiment, HEATTIME is set to 200, corresponding approximately to 20 seconds, due to the 100 millisecond iteration rate of the routine of FIGS. 3a-3c.

If FLAMTIME is less than HEATTIME at step (124), more heating of the converter (26) is assumed to be necessary to reach light-off, and the routine proceeds to step (128) through (132) to provide maximum fuel and air to the burner (10). First, at step (128), FUEL is compared to MAXFUEL, the maximum allowable fuel command for the fuel metering means 28 (FIG. 1). If FUEL exceeds or is equal to MAXFUEL at step (128), it is limited to MAXFUEL. Otherwise, FUEL is increased by an amount $\Delta F$ at step (130). Accordingly, FUEL is increased by $\Delta F$, set to three percent duty cycle in this embodiment, at step (130). This incremental increase in injector duty cycle provides a substantially linear increase, approximately 3 percent duty cycle per 100 milliseconds, in fueling to the burner 10. Such an increase starts from the initial command FLAMFUEL to a maximum command MAXFUEL. This restricts the increase of fuel to the burner to an amount proportional to the build-up of air in the burner, so that fuel and air may increase in controlled relative proportion during the heating phase of the burner control.

The inertial and frictional loads on the air pump (38) combined with the compressibility of air, limits the rate at which airflow can increase to the burner (10). Such constraints not necessarily being present on fuel flow rate into the burner (10), the fuel increase must be controlled, for example by ramping the increase from a startup value to the maximum value, so that a beneficial relative proportion of fuel and air may be provided to the burner (10), for proper combustion. While a range of air/fuel ratios in the burner will support adequate combustion, the inventors have selected an air/fuel ratio of approximately 16 to 1 as being preferred during this heating phase of the burner (10).

Accordingly, this routine, to provide maximum heat energy into the converter at a desired air/fuel ratio, will command a maximum air flow from pump (38), to allow the airflow to build up as rapidly as possible, and will graduate the fuel command at step (130), from the FLAMFUEL level of fuel used to initially ignite the burner at step (120), to MAXFUEL, at a rate calibrated to substantially maintain a stoichiometric ratio while airflow is building up. This calibration may be provided by monitoring the build-up of airflow through conduit (42) over a period of time after a step change in commanded air from the FLAMBLOW command to the MAXBLOW command, such as is done at time $t_f$ in FIG. 4b.

Returning to step (130), after increasing the command FUEL by an amount $\Delta F$, or if FUEL has already been increased to MAXFUEL as determined at step (128), the routine advances to step (132), to set the air command BLOW to MAXBLOW, a predetermined maximum commanded airflow, to provide the maximum build-up of air into the burner (10), as discussed. In this embodiment, MAXBLOW is set as 255, or 100 percent of pump rated capacity. The routine then moves to step (134), to be discussed.

Back to step (124), if FLAMTIME exceeds HEATTIME, such as illustrated at time $t_h$ in FIGS. 4a and 4b, it is assumed that sufficient combustion energy has been provided to the exhaust gas to heat the catalytic converter (26) substantially to its light-off temperature. The routine may then proceed to step (126), to cut back the air and fuel commands to the burner (10) in accord with a second phase of post-combustion burner control, in which the burner operates to hold the converter (26) at a predetermined temperature, sufficient to support exothermic activity in the converter (26). This mode operates until the exhaust gas is assumed to be at a temperature at which its heat alone can maintain such converter activity. It should be noted that the heating characteristics of certain engine-converter combinations may be such that this temperature hold phase is not needed.

The timing used to switch from the first post-combustion mode (temperature increase mode), as illustrated in FIGS. 3a and 3b as steps (128-132), to the second mode (maintain temperature mode), illustrated by step (126), requires a calibration of the specific burner system used in the application, such as that used in FIG. 1. The calibration must include a determination of the amount of time necessary to heat the catalyst at cold start conditions to its light-off temperature. In this embodiment, this time is calibrated as 20 seconds, meaning that, under the 100 millisecond repetition rate of the routine of FIGS. 3a-3c, HEATTIME must be set to 200.

The inventors intend however, that this timing may be avoided by monitoring catalytic converter temperature directly, such as periodically reading temperature sensor (46), and by switching from post-combustion phase 1 to post-combustion phase 2 when the converter temperature is sensed to be approximately at light-off, such as approximately 500 degrees Celsius.

Specifically at step (126), the air command BLOW is reduced to approximately 38 per cent of its rated capacity, and fuel is reduced to 47 percent duty cycle, such that only enough heat energy will be released by burner (10) to maintain the converter temperature substantially at or above 500 degrees Celsius.

After setting appropriate BLOW and FUEL commands at steps (104-132), the routine passes to step (134), to read the temperature of the catalytic converter (26) from sensor (46) (FIG. 1). Next, at step (136), if the sensed converter temperature exceeds MAXTEMP, a calibrated maximum tolerable converter temperature, for instance based on well-known recommended catalytic converter operating-temperature limits such as 800 degrees Celsius, a fault is presumed to exist in the burner heating system in accord with this invention. The routine thus proceeds to step (142) to indicate a fault, as described. The routine then advances to step 144, to disable the burner if it is still operating, so that the converter temperature is not elevated to a level that may damage the converter (26).

Returning to step (136), if the converter (26) is not overheating, the routine proceeds to step (138), to determine if the converter is "underheating," which is when the converter is determined to be heating more slowly than it should under normal operating conditions. Specifically, if flame has been present in the burner (10) for a predetermined period of time called WRMTIME, set to fifteen seconds in this embodiment, the converter temperature should, under normal operating conditions, such as fault free conditions, be above a minimum threshold temperature MINTEMP, set at 300 degrees Celsius in this embodiment. WRMTIME and MINTEMP should be calibrated according to normal heating patterns for a given burner and converter, such as those of FIG. 1. Accordingly, if FLAMTIME exceeds WRMTIME at step (138), the routine proceeds to step (140), to determine if the sensed temperature of the catalyst, such as from the temperature sensor (46), exceeds the calibrated minimum temperature MINTEMP. If so, or if FLAME TIME does not exceed WRMTIME, the routine proceeds to step (146), to trim the calculated fuel command FUEL.

However, if at step (140), the converter temperature is less than MINTEMP, the routine moves to indicate a heating fault at step (142), as discussed, and then disables the burner at step (144). The routine then returns to the background routine of FIG. 2 without re-enabling the interrupt used to execute the routine of FIGS. 3a-3c. Accordingly, upon the occurrence of a heating fault, such as at step (106), (108), (136), or (140), a fault is indicated and the routine of FIGS. 3a-3c is abandoned until the next engine start-up.

Returning to step (146), the fuel pulse width command FUEL is adjusted to compensate for a variety of external factors. One such factor may be the fuel metering means drive voltage which may vary with the changing demands put on the vehicle power system. Such variations may affect the precision of the quantity of fuel metered to the burner (10) for a given commanded pulse width. Changes in the drive voltage may be sensed in a conventional manner, such as by directly monitoring changes in vehicle battery voltage, or by providing a sense resistor (not shown) in line with the supply current to the metering means (28), and monitoring changes in the voltage drop across the resistor. The command FUEL may then be increased or decreased to the extent necessary to ensure a desired amount of fuel is provided to the burner (10).

Other external factors may include those factors that do not directly affect the amount of fuel metered to the engine for a given command, but affect the desired quantity of fuel to be admitted to the burner (10). For instance, it may be desirable to provide the fuel and air to the burner (10) at a predetermined ratio, as described. As such, substantially uncontrollable external factors affecting airflow into the burner are adjusted for in the fuel command at step (146). Such factors may include changes in engine vacuum, in external air pressure, and in exhaust gas backpressure.

For reasons well-known in the art of engine control, changes in these factors will, for a given pump outlet pressure, directly affect the airflow to the burner, and can be compensated for by sensing these factors using conventional sensing means, and then compensating the amount of fuel admitted to the burner (10) for the resultant expected amount of air that will reach the burner from the pump (38). Fuel is adjusted rather than air in this embodiment due to its inherent controllability advantages over air. The fuel adjustments for a given change in airflow from these external factors may be predetermined such as in a calibration step, and stored in ECM non-volatile memory, such as ROM (44), for table look-up as functions of the sensed external factors.

After making any necessary fuel adjustments in the command FUEL at step (146), the routine advances to step (148), to compare FUEL to FUELLIMIT, a maximum tolerable fuel command calibrated for the system of FIG. 1. In this embodiment, FUELLIMIT is set to five milliseconds, which is equivalent to 100 percent duty cycle. If FUEL exceeds FUELLIMIT, it is limited to FUELLIMIT at step (150). Next, or if FUEL was not limited at step (150), the routine proceeds to step (152), to correct the commanded airflow to the burner (10). This correction is made for any deviations in the pump drive voltage, such as those resulting from a varying vehicle power supply voltage. As was discussed for step (146), if a change in available power, in this case to the pump (38), is sensed, for example by sensing changes in battery supply voltage, the commanded amount of air from the pump may be changed to provide the desired amount of airflow to the burner (10).

After trimming the pump command for any changes in pump drive voltage at step (152), the routine of FIG. 3c proceeds to step (154), to check the amount of time the routine of FIGS. 3a-3c has been operating. If it has been operating for longer than MAXTIME, calibrated as sixty seconds in this embodiment, and illustrated generally as time $t_{max}$ in FIGS. 4a and 4b, the routine proceeds to step (144), to disable the burner. As described, burner heating in accord with this invention is meant to rapidly elevate the catalytic converter (26) to its light-off temperature. After a period of time the engine exhaust gas heat is of sufficient temperature that alone it may maintain converter temperature to allow proper exothermic activity in the converter (26). The burner (10) may then be disabled.

Returning to FIG. 3c, if RUNTIME did not exceed MAXTIME at step (154), the routine moves to step (158), to enable the interrupt that allows execution of this routine, such that it, in this embodiment, will occur approximately 100 milliseconds after the last of such interrupts. The routine then proceeds to step (160), to issue the determined fuel command FUEL and the determined air command BLOW to the fuel metering means driver (54) and the pump driver (50), respectively. As discussed, the command FUEL will automatically be converted in the metering means driver (54) to an injector pulse-width in the preferred embodiment, and the command BLOW will be converted in the pump driver (50) to a commanded current level to the pump (38). After issuing the commands at step (160), the routine moves to step (162), where it is directed to return to the background routine of FIG. 2.

Returning to step (144), after disabling the burner, such as if RUNTIME exceeded MAXTIME at step (154), or from the described previous steps (96), (98), or (142), the routine moves to step (160), to issue the commands FUEL and BLOW, as discussed. The routine then returns to the background routine of FIG. 2, via step (162).

The description of a preferred embodiment for the purpose of explaining the invention is not intended to limit or restrict the invention since many modifications may be made by the exercise of skill in the art without departing from the scope of the invention.

The embodiments of the invention in which a property or privilege are claimed are described as follows:

1. A method of heating internal combustion engine exhaust gas by igniting an air-fuel mixture in an exhaust gas path of the engine, comprising the steps of:
   preparing for ignition of the air-fuel mixture by priming a fuel line leading to the exhaust gas path and an air line leading to the exhaust gas path;
   igniting the air-fuel mixture and
   providing for rapid exhaust gas heating by adjusting, upon ignition of the metered fuel and air, at least one of a first predetermined fuel rate at a first predetermined time rate of change toward a predetermined maximum fuel rate and a first predetermined air rate at a second predetermined time rate of change toward a predetermined maximum air rate.

2. The method of claim 1, wherein the priming further comprises the steps of:
   metering fuel to the exhaust gas path at a predetermined maximum fuel priming rate and reducing the fuel metering rate from the predetermined maximum fuel priming rate to the first predetermined fuel rate after a first predetermined period of time; and
   metering air to the exhaust gas path at a predetermined maximum air priming rate and reducing the air metering rate from the predetermined maximum air priming rate to the first predetermined air rate after a second predetermined period of time.

3. The method of claim 1, wherein the providing step further comprises the steps of:
   limiting the adjusted first predetermined fuel rate to the predetermined maximum fuel rate and limiting the adjusted first predetermined air rate to the predetermined maximum air rate; and
   reducing the limited first predetermined fuel rate to a predetermined fuel hold rate and reducing the limited first predetermined air rate to a predetermined air hold rate when approximately a first predetermined amount of heat energy has been provided to the exhaust gas.

4. The method of claim 3, further including the step of substantially stopping flow of fuel and air to the exhaust gas path when approximately a second predetermined amount of heat energy has been provided to the exhaust gas path.

5. An apparatus for heating internal combustion engine exhaust gas by igniting an air-fuel mixture in an internal combustion engine exhaust gas path, comprising:
   means for metering fuel to the exhaust gas path at a first predetermined fuel rate;
   means for metering air to the exhaust gas path at a first predetermined air rate;
   means for igniting the metered fuel and air;
   means for adjusting the first predetermined fuel rate at a first predetermined time rate of change toward a predetermined maximum fuel rate upon ignition of the metered fuel and air; and
   means for adjusting the first predetermined air rate at a second predetermined time rate of change toward a predetermined maximum air rate upon ignition of the metered fuel and air.

6. The apparatus of claim 5, further comprising:
   fuel priming means for metering fuel to the exhaust gas path at a predetermined maximum fuel priming rate, and for reducing the fuel metering rate from the predetermined maximum fuel priming rate to the first predetermined fuel rate after a first predetermined period of time; and
   air priming means for metering air to the exhaust path at a predetermined maximum air priming rate, and for reducing the air metering rate from the predetermined maximum air priming rate to the first predetermined air rate after a second predetermined period of time.

7. The apparatus of claim 5, further comprising:
   means for limiting the adjusted first predetermined fuel rate to the predetermined first maximum fuel rate;
   fuel rate reducing means for reducing the limited fuel rate to a predetermined fuel hold rate when a predetermined amount of heat energy has been supplied to the exhaust gas;
   means for limiting the adjusted first predetermined air rate to the predetermined first maximum air rate; and
   air rate reducing means for reducing the limited air rate to a predetermined air hold rate when the predetermined amount of heat energy has been supplied to the exhaust gas.

8. The apparatus of claim 7, further comprising means for inhibiting flow of the metered fuel and air to the exhaust gas path after a second predetermined amount of heat energy has been supplied to the exhaust gas path.

* * * * *